United States Patent
Lee

(10) Patent No.: US 9,277,285 B2
(45) Date of Patent: Mar. 1, 2016

(54) BROADCASTING METHOD AND SYSTEM WITH VARIABLE AUDIO/VIDEO PROGRAM MENU

(75) Inventor: Tung-Chou Lee, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 313 days.

(21) Appl. No.: 13/084,768

(22) Filed: Apr. 12, 2011

(65) Prior Publication Data

US 2011/0252448 A1   Oct. 13, 2011

(30) Foreign Application Priority Data

Apr. 12, 2010  (TW) ................. 99111321 A

(51) Int. Cl.
| | | |
|---|---|---|
| *H04N 7/025* | (2006.01) | |
| *G06F 3/00* | (2006.01) | |
| *G06F 13/00* | (2006.01) | |
| *H04N 21/482* | (2011.01) | |
| *H04N 21/45* | (2011.01) | |
| *H04N 5/445* | (2011.01) | |
| *H04N 21/462* | (2011.01) | |
| *H04N 21/472* | (2011.01) | |
| *H04N 21/436* | (2011.01) | |

(52) U.S. Cl.
CPC ......... *H04N 21/482* (2013.01); *H04N 5/44543* (2013.01); *H04N 21/436* (2013.01); *H04N 21/4532* (2013.01); *H04N 21/4622* (2013.01); *H04N 21/47214* (2013.01); *H04N 21/4821* (2013.01)

(58) Field of Classification Search
None
See application file for complete search history.

(56) References Cited

U.S. PATENT DOCUMENTS

| | | | | |
|---|---|---|---|---|
| 5,710,605 A  * | 1/1998 | Nelson | .......................... | 348/734 |
| 6,782,550 B1 | 8/2004 | Cao et al. | | |
| 7,076,733 B2 * | 7/2006 | Smith | ........................... | 715/716 |
| 8,037,493 B2 * | 10/2011 | Migos | ............................. | 725/39 |
| 8,744,243 B2 * | 6/2014 | Devlin | .................... | H04N 5/76 |
| | | | | 386/224 |

(Continued)

FOREIGN PATENT DOCUMENTS

| | | |
|---|---|---|
| CN | 1941862 | 4/2007 |
| CN | 101212599 | 7/2008 |

(Continued)

OTHER PUBLICATIONS

CN OA issued on Jun. 23, 2011.

(Continued)

*Primary Examiner* — Jonathan V Lewis
(74) *Attorney, Agent, or Firm* — WPAT, PC; Justin King

(57) ABSTRACT

A broadcasting system for AV program selection comprising a network, an AV signal providing system, a user device and a digital AV signal processing device is proposed. The network, the AV signal providing system, the user device and the digital AV signal processing device are in communication with each other via the network. A broadcasting method is applied to the AV signal providing system. The broadcasting method comprises steps of: providing a plurality of AV programs for selection; and transmitting an AV signal corresponding to a selected one of the plurality of AV programs to the digital AV signal processing device in response to a user's selecting operation on an AV program menu revealed by way of the digital AV signal processing device, wherein the AV program menu contains information of only partial the plurality of AV programs, and is created by way of the user device.

16 Claims, 3 Drawing Sheets

(56) References Cited

U.S. PATENT DOCUMENTS

| | | | |
|---|---|---|---|
| 8,990,728 B2* | 3/2015 | Oshiro | G06F 3/0481 715/716 |
| 2001/0033244 A1* | 10/2001 | Harris et al. | 341/176 |
| 2002/0059588 A1 | 5/2002 | Huber et al. | |
| 2002/0162108 A1* | 10/2002 | Lin-Hendel | 725/52 |
| 2003/0033157 A1 | 2/2003 | Dempski et al. | |
| 2003/0070168 A1* | 4/2003 | Stone | 725/37 |
| 2006/0010467 A1 | 1/2006 | Segel et al. | |
| 2006/0026643 A1* | 2/2006 | Silverberg et al. | 725/46 |
| 2006/0123010 A1* | 6/2006 | Landry et al. | 707/10 |
| 2008/0092169 A1 | 4/2008 | Shannon et al. | |
| 2008/0163307 A1* | 7/2008 | Coburn et al. | 725/61 |
| 2008/0178224 A1* | 7/2008 | Laude et al. | 725/44 |
| 2008/0209495 A1 | 8/2008 | Kwon et al. | |
| 2008/0238755 A1* | 10/2008 | Cruz et al. | 341/176 |
| 2009/0138907 A1 | 5/2009 | Wiser et al. | |
| 2009/0228919 A1* | 9/2009 | Zott et al. | 725/34 |
| 2009/0271837 A1* | 10/2009 | Kim | H04N 7/17318 725/110 |
| 2010/0043023 A1* | 2/2010 | Austin et al. | 725/37 |
| 2010/0241967 A1 | 9/2010 | Lee | |
| 2010/0325661 A1 | 12/2010 | Lee | |
| 2011/0202945 A1* | 8/2011 | Pickelsimer | H04N 5/44543 725/1 |

FOREIGN PATENT DOCUMENTS

| | | |
|---|---|---|
| CN | 101257566 | 9/2008 |
| CN | 101365076 | 2/2009 |

OTHER PUBLICATIONS

China Patent Office OA issued on Nov. 3, 2011.
Taiwain Patent Office, "Search Report", Jan. 20, 2015.

* cited by examiner

BROADCASTING METHOD AND SYSTEM WITH VARIABLE AUDIO/VIDEO PROGRAM MENU

FIELD OF THE INVENTION

The present invention relates to a broadcasting method and system, and more particularly to a broadcasting method and system with a variable audio/video (hereinafter, AV) program menu created, selected, or edited via a user device.

BACKGROUND OF THE INVENTION

Digital Set-top box (hereinafter, STB) and TV are devices for receiving, decoding, and broadcasting digital TV programs. A play station digitalizes, converts, and compresses TV programs in digital AV signal format (hereinafter, AV program) before transmission. A user may watch TV programs through a digital TV or a STB with an analog TV after AV programs are received.

With the improving of technology, bandwidth available for media transmission increases at meanwhile. This implies that AV program providers may provide more real-time information and value-added services. Furthermore, users may operate a digital TV or STB with its user interface (hereinafter, UI) providing multifunction, and interact with program providers through an interactive operation platform.

Varied from the transmission media, conventional digital TV and STB generally receive TV programs from a satellite, a terrestrial, or a network. Among these transmission media, many users are used to watch TV programs in a relatively passive style such as watching programs transmitted by the satellite or the terrestrial. In fact, when the TV programs are transmitted by the satellite or the terrestrial, the schedule of TV programs are predetermined by program providers. In other words, users are not able to decide the time and content of AV programs being transmitted but passively watch AV programs. On the other hand, internet protocol television (hereinafter, IPTV) provides interactive functions, and users may actively select and watch their favorite AV programs. Through IPTV, the approach how users operate STB or digital TV becomes more actively.

FIG. 1 is a schematic diagram illustrating the receiving and broadcasting function of an IPTV. A user device may be connected to a digital TV 15 or disposed between a STB 13 and a traditional analog TV 11 so as to communicate with the network 17. Via the network 17, the STB 13 or the digital TV is capable of accessing the AV program database via the service platform of program providers 19. In other words, IPTV provides interactive functions between users and program providers in addition to broadcasting TV programs.

Conventional AV program providers provide same user interfaces for users, and it means that users operate identical interface pages. With the increasing number of AV programs, this operation style results in that every user can watch their preferred AV programs only after complicated operations.

Although IPTV provides interaction functions, it accompanies disadvantages that the users can be easily confused with the complicated UI. Besides, the limited number of keys on remote controllers causes problems for selection and operation while watching TV programs.

In conclusion, conventional IPTV provides various functions for interactive operations, but its complicated operation flow results in operation difficulties for users. As remote controllers are used for selecting AV programs, they are not ideal for complicated operations. Besides, some users do not want to spend too much time in understanding complicated operations in conventional IPTV services. Hence, it is desirable to find a convenient approach for users.

SUMMARY OF THE INVENTION

Therefore, the present invention relates to a broadcasting method and system for AV program selection. The present invention provides a broadcasting method of an audio/video (AV) signal providing system. The AV signal providing system is communicable with a user device and a digital AV signal processing device via a network, the method comprising steps of: providing a plurality of AV programs for selection; and transmitting an AV signal corresponding to a selected one of the plurality of AV programs to the digital AV signal processing device in response to a user's selecting operation on an AV program menu revealed by way of the digital AV signal processing device, wherein the AV program menu contains information of only partial the plurality of AV programs, and is created by way of the user device.

The present invention provides a broadcasting system, comprising: a network; an AV signal providing system, in communication with the network, for providing a plurality of AV programs; a user device, in communication with the network, for creating an AV program menu containing only partial the plurality of AV programs; and a digital AV signal processing device, in communication with the network, for revealing the AV program menu received via the network, and playing a selected one of the plurality of AV programs in response to a user's selecting operation on the AV program menu revealed thereby.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
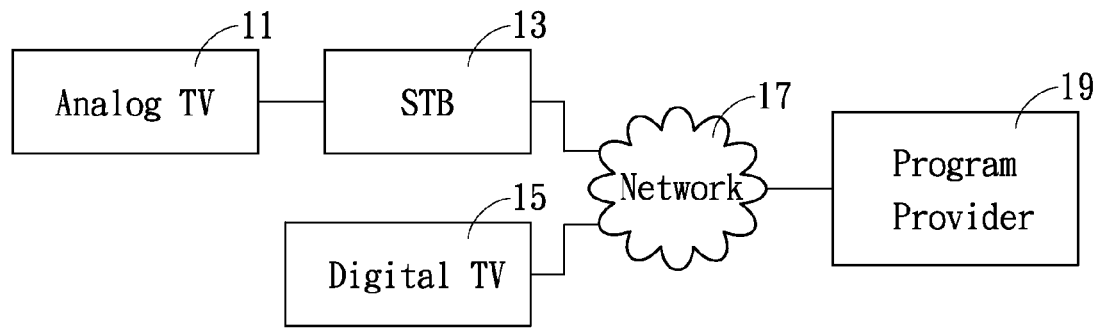
FIG. 1 is a schematic diagram illustrating the receiving and broadcasting function of an IPTV.
Figure 2:
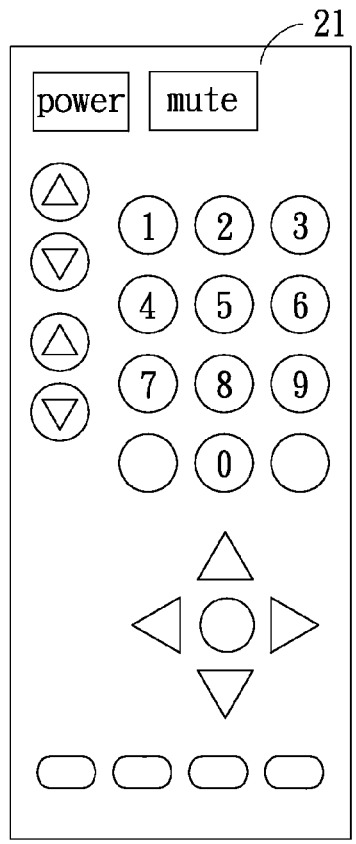
FIG. 2 is a schematic diagram illustrating a remote controller for controlling a digital AV signal processing device.

FIG. 2 is a schematic diagram illustrating a remote controller for controlling a digital AV signal processing device. In many cases, a user uses a remote controller 21 as an operation interface for controlling digital TV or STB. However, the number of keys on the remote controller 21 is limited and it brings difficulties for complicated usages. For example, if the operation menu provides multiple pages, a user has to press direction keys repeatedly. Besides, if a user intends to enter a program title for searching, conventional approaches provide an on-screen keyboard to display name of keys, and the user has to select the corresponding alphabets in direction keys or number keys on the remote controller 21.

In other words, the inputting approaches provided by conventional techniques result in problems like repeated switching of keys for changing capital letters and lower case letters, or redundant switching of keys with multiple mappings. Such inputting approaches bring inconveniences for a user especially for entering strings.

According to the Taiwan application serial number 098109388, the applicant proposed an approach to utilize user devices such as a personal computer (PC), personal digital assistant (PDA) etc. to provide editing functions for user operation interface and personal menus. The present invention intends to base on such techniques and further provides editing function for program menus so that a user may filter the AV programs provided by the AV signal providing system through the operation of the user device in advance. Among the numerous AV programs provided by the AV signal providing system, a user is able to select preferred digital AV programs and create corresponding AV program menus, and the AV program menus are transmitted to the digital AV signal processing device through the network.

Further speaking, the user devices are connected to the AV signal providing system from AV service providers and used for selecting AV program contents. While operating the user devices, the selection of AV programs may be done by common input devices such as keyboard, mouse, or touch screen. After the AV program menu is created via the user device, the created AV program menu can be fetched through the network service while the user is operating the digital TV or STB associated therewith. This approach is relatively friendly compared to the case of operating a remote controller.

Depending on purposes, the present invention can be applied to different but similar services. For example, the AV signal providing system may be an IPTV service provider or a network-attached storage (hereinafter, NAS). The NAS allows a user to provide his/her personal AV programs via the network in a form of an internet server, and the user may utilize a computer to edit and display the AV program menu. After the edited AV program menu is received by digital TV or STB, the user may watch AV programs according to the AV program menu.

Similar approaches can be applied to distance learning program that students usually use PC to connect to the course providing server through network and watch the content of teaching programs. With the present invention, a user may connect to the course providing server for course selection and receive different course list with a PC, and students may edit the watching status of courses on the received course list. Afterwards, students may watch the course content of selected course through digital TV or STB. By doing so, students do not need to use remote controller for complicated settings and are able to watch the course content with a bigger screen, rather than the small screen of PC.

Figure 3:
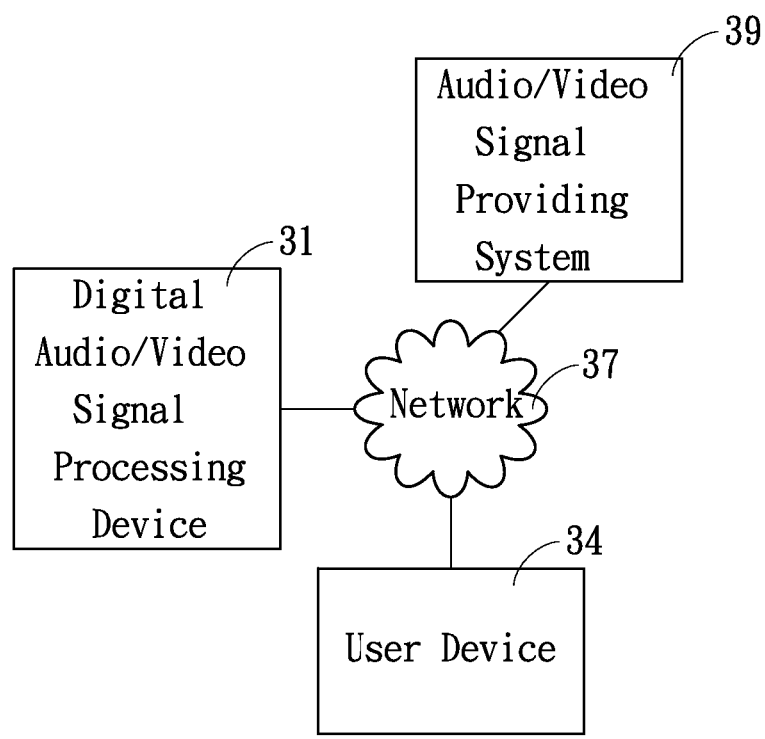
FIG. 3 is a schematic diagram illustrating block diagrams of broadcasting system for digital AV program selection proposed in the present invention.

FIG. 3 is a schematic diagram illustrating block diagrams of broadcasting system for digital AV program selection proposed in the present invention. The broadcasting system for digital AV program selection mainly comprises: a user device 34, a AV signal providing system 39, and a digital AV signal processing device 31, wherein a network 37 is used for the signal connection between the user device 34, the AV signal providing system 39 and the digital AV signal processing device 31. Any approaches for creating signal connection and data transmission can be considered, and these different approaches do not affect the core thinking of the present invention. Therefore, the network 37 might be a wired or wireless network and the transmission formats are not limited. Besides, the network 37 between the digital AV signal processing device 31, the AV signal providing system 39 and the user device 34 can be homogeneous or heterogeneous network.

The present invention proposes an approach to set, edit, and determine an AV program menu through the user device 34 and simplify the control flow while using remote controller to control the digital AV signal processing device 31.

The user device 34 is linked to the network 37 so as to be able to access to the AV signal providing system and select a desired one of the AV programs therefrom. Therefore, a user may preview program guides provided by the AV signal providing system 39 through the user device 34. According to the program guides, the user may retrieve or fetch AV program menus and edit attributes of file folders via the operation of the user device 34. In consequence, the digital AV signal processing device 31 can receive the corresponding file folders, and display AV program menus according to the relative information provided in the file folders. After the AV program menu is received, the digital AV signal processing device 31 receives and displays AV programs transmitted by the AV signal providing system 39 according to the AV program menu.

Based on the at least one AV program guide provided by the AV signal providing system 39, the user may create or access AV program menus and corresponding file folders through the operation interface of the digital AV signal processing device 31. Besides, during the connection between the user device 34 and the AV signal providing system 39, users may watch the AV program guide, determine their preference contents, edit AV program menus, and create corresponding file folders according to AV program menus.

For example, if we consider the user device 34 as a PC, the user may use a mouse to scroll up and down to browse the various program guides. The user may also use a keyboard to enter a search item, e.g. program titles or key words of interested AV programs. Such input operations are not easy for common digital TV or STB with remote controllers but relatively easy for PC as many various input devices can be used. The broadcasting method provided in the present invention uses the user device 34 to select AV programs for an AV program menu, and retrieves the AV program menu for the digital AV signal processing device 31 to display.

The AV program menu may be stored by the AV signal providing system 39 or the user device 34, and transmitted via the network 37 when the digital AV signal processing device 31 is startup and in communication with the network 37. After the AV program menu is received, the digital AV signal processing device 31 displays the AV program menu on the screen of TV. After the user selects an AV program according to the edited AV program menu, the digital AV signal processing device 31 starts to receive and broadcast the selected AV program transmitted by the AV signal providing system 39.

In other words, the selected AV programs are pre-filtered through the user device 34 and AV program menus are created. Therefore, users need only focus on the AV program menus when they use remote controllers for controlling digital TV or STB. By doing so, it reduces inconveniences for using limited keys on the remote controller and avoids the problem of searching a huge amount of AV programs each time.

In the present invention, the approaches about how a digital AV signal processing device 31 retrieves the AV program menu may vary. For example, the AV program menu may be transmitted by the AV signal providing system 39 or the user device 34 in response to an active receiving request from the digital AV signal processing device 31. On the other hand, the AV program menu may be passively received by the digital AV signal processing device 31 after its transmission from the AV signal providing system 39 or the user device 34. The digital AV signal processing device 31 may be used to further select and edit the AV program menu, so that the user may edit, adjust or modify the content of the AV program menu via its corresponding pre-built file folder.

For example, the AV program menu edited by the user through the user device 34 could be a favorite list or a to-be-watched list. For the favorite list case, users may set AV programs with their preference order or favorite types. As for the to-be-watched list case, users may remove the watched AV programs or change the watching status of such AV programs on the AV program menu. The AV program menu edited or modified by the digital AV signal processing device 31 can be synchronized with the user device 34 or the AV signal providing system 39 through the network 37. By modifying the data attributes of file folders, users may edit or select the AV program menu more easily. Such operation and control flow can be provided via the UI of the digital AV signal processing device 31 to assist the present invention.

Moreover, in the Taiwan patent application serial number 098121022, same applicant proposed a method for providing personal UI of STB according to different preferences or users' requests. In the patent application, multiple operation interfaces are provided for different family members using same STB device. The present invention can be applied to the patent application.

Therefore, once a user operates the user device 34 to select AV programs provided by AV signal providing system 39, the user may define or determine different AV program menus in respect to different family members. For example, the user may connect a PC to the AV signal providing system 39 and edit the AV program menu α (and create the corresponding file folder α) and the AV program menu β (and create the corresponding file folder β) respectively. Assume the AV program menu α relates to political talk show programs for a grandfather and the AV program menu β relates to cartoon programs for a grandchild. Therefore, depending on whether the grandfather or the grandchild operates the digital AV signal processing device 31, the digital AV signal processing device 31 displays different AV program menus. That is, if the identification process returns the user identity as the grandfather, the digital AV signal processing device 31 displays the AV program menu α according to the file folder α and vice versa.

In addition to determining individual AV program menus according to users' preferences, different AV program menus may be used together. For example, a parent may use a PDA to connect to WebPages with program guides provided by AV program providers and edit different types of AV program menus. The parent may use the PDA to list educational programs for children in the AV program menu A (or create a corresponding file folder A). The user may further list the News program in the AV program menu B (or create a corresponding file folder B), and list TV programs suitable for whole family in the AV program menu C (or create a corresponding file folder C).

After that, whenever a member in the family operates the digital AV signal processing device 31, the digital AV signal processing device 31 first receives the AV program menus A, B and C according to the corresponding file folders A, B and C. The digital AV signal processing device 31 receives the AV program menus A, B and C from the AV signal providing system 39 or the user device 34 through the network 37. The digital AV signal processing device 31 displays AV program menu corresponding to the recognized identity of the user. In other words, different family members may use different AV program menus for AV program selection according to their identities.

For example, when the user operating the digital AV signal processing device 31 is an adult, the user may select the AV programs according to the union of the AV program menu B and the AV program menu C. In other words, the program titles of digital AV programs in the file folder B and file folder C are all listed and displayed together.

If the user operating the digital AV signal processing device 31 is a child, the digital AV signal processing device 31 displays the union of the AV program menu A and the AV program menu C according to the necessaries of the child. In other words, the program titles of digital AV programs in the file folder A and file folder C are all listed and displayed together.

Therefore, the selection and editing function of the AV program menu provided by the user device 31 contributes the conveniences for users while operating digital AV signal processing device 31.

Figure 4:
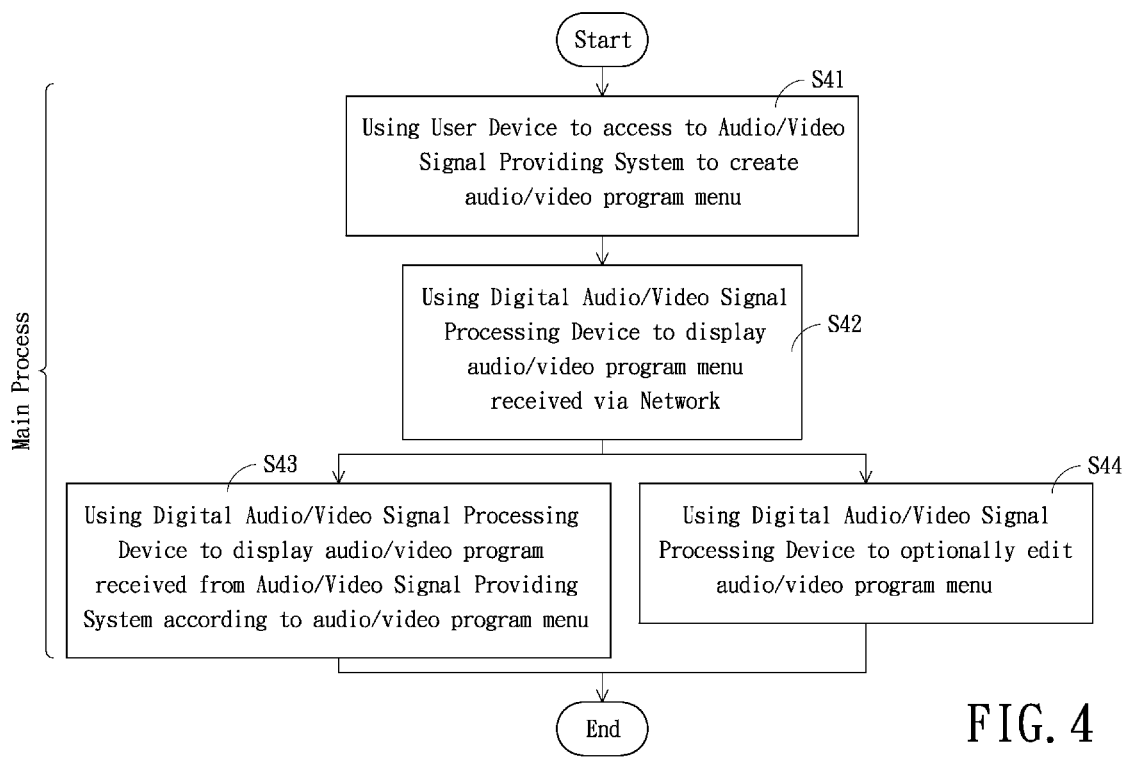
FIG. 4 is a flow chart illustrating the broadcasting method for AV program selection.

FIG. 4 is a flow chart illustrating the broadcasting method for selecting AV program menu. According to the above explanation, the broadcasting method for selecting AV program menu is applied to the AV signal providing system 39. The AV signal providing system 39 is communicable with the user device 34, and the digital AV signal processing device via the network 37. The broadcasting method for AV program selection mainly comprises steps below:

First of all, obtaining an AV program menu or corresponding file folders through the user device for selecting AV program data provided by the AV signal providing system. Therefore, at least one AV program menu is created via the user device's access to AV signal providing system (Step S41).

The digital AV signal processing device displays the AV program menu received through the network from the user device or the AV signal providing system (Step S42). The digital AV signal processing device receives and displays an AV program transmitted by the AV signal providing system according to the AV program menu (Step S43). The digital AV signal processing device provides a UI for creating the selected program menu.

In addition to the main process of creating and receiving the AV program menu via the network, the digital AV signal processing device further provides functions for editing the AV program menu. Hence a user can use the digital AV signal processing device to optionally edit AV program menu (Step S44). After being edited, the edited AV program menu is stored in the digital AV signal processing device, and is further updated to the copies of the AV program menus saved in the user device or the AV signal providing system for synchronization.

In details, the step S41 may further comprise the following steps: the AV signal providing system 39 provides at least a program guide, and the user can read, access, or fetch the content of the program guide through the operation of the user device 34. The program guide provided by the AV signal providing system 39 can be a short paragraph of sentences for introducing the AV program, or a short preview clip of the AV program.

With the program guide, users can decide whether they want to watch the AV program or not. If the answer is positive, users can add the AV program to their favorite AV program menu. If the answer is negative, the AV program will not be selected and the digital AV signal processing device will not display the program title on its screen. Therefore, users may classify the AV programs into different favorite groups and corresponding file folders.

It should be noticed that, when the AV signal providing system 39 provides AV program guides for users to create or determine the AV program menu, the providing approaches of AV program menu may vary. For example, the AV signal providing system 39 can provide file folders or homepages to display AV program menus. The user can select or edit the attributes of the AV programs via the user device 34, and create corresponding AV program menu or personal folders.

The classification of the AV program menus or file folders can be varied according to the preferences of users. For example, AV program menus may be set as a to-be-watched AV program list, a favorite AV program list, or define different AV program menus according to different family members.

According to the application, the AV program menu can be created or modified by the operation interface provided by the digital AV signal processing device 31 or the user device 34. For the digital AV signal processing device 31 case, the digital AV signal processing device 31 receives the AV programs provided by the AV signal providing system 39 through the network 37. As for the user device 34 cases, the AV program menu can be stored separately or simultaneously in the AV signal providing system 39 and the user device 34. Therefore, the predetermined AV program menus can be provided to the digital AV signal processing device 31 either by the AV signal providing system 39 or by the user device 34.

The AV signal providing system 39 or the use device 34 may actively provide AV program menu to the digital AV signal processing device 31 while the digital AV signal processing device is connected to the network 37. The digital AV signal processing device 31 may also actively request for receiving AV program menu to the AV signal providing system 39 or the user device 34. The AV program menus and the corresponding file folders are transmitted by the AV signal providing system 39 or the user device 34 and received by the digital AV signal processing device 31 through the network 37. For the digital AV signal processing device 31, the AV program menus can be displayed as different file folders, WebPages, or lists. Afterwards, the digital AV signal processing device 31 receives the AV program menu and displays or list the AV program menu on the TV screen. In other words, the approach of creation, fetching or retrieving the AV program menu is flexible according to the present invention.

As for the step S45 that the digital AV signal processing device 31 receives an AV program transmitted by the AV signal providing system according to the AV program menu, some detail steps are further illustrated. After the user triggers the digital AV signal processing device 31, the digital AV signal processing device 31 actively or passively receives the AV program menu via the network 37; the digital AV signal processing device 31 provides the AV program menu to a user for selecting to-be-watched AV programs; the digital AV signal processing device 31 transmits the reply message of a selected AV program to the AV signal providing system 39 through the network; and the digital AV signal processing device 31 starts to broadcast the selected AV program received from the transmission of the AV signal providing system 39.

In step S47, the digital AV signal processing device 31 does not only receive the predetermined AV program menu from the user device 34 for a user's selection of AV programs, but also provides the creating and editing function for the AV program menu through UI. Therefore, the user can adjust, edit or manage the AV programs contained in the AV program menu.

Furthermore, users may create various AV program menus or file folders according to the different settings of the UI, and the attributes of AV programs. Consider a case that an AV program menu contains selected AV programs that a user wants to watch during holidays. Once an AV program contained in the AV program menu is watched, the watching status of the watched AV program may be changed by a user manually via a remote controller, or updated automatically by the digital TV device 31.

Through providing editing function at the digital AV signal processing device 31, the operation control flow of the remote controller becomes clearer and smooth for users. Besides, the watching status of selected AV programs contained in the AV program menu can be synchronized or updated. Therefore, the AV signal providing system 39 or the user device 34 receives the latest watching status of AV program menus whenever the digital AV signal processing device 31 connects to the AV signal providing system 39 or the user device 34.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A broadcasting method of an audio/video (AV) signal providing system which is one of an internet protocol television (IPTV) service provider and a network-attached storage (NAS), the AV signal providing system being communicable with a digital AV signal processing device, and the digital AV signal processing device comprising a digital Set-top box and a TV, the method comprising steps of:
   communicating a mobile user interface, which exhibits an editing function, to the digital Set-top box of the AV signal providing system and the digital AV signal processing device via a network;
   providing a plurality of AV programs by the AV signal providing system for selection;
   creating a file folder of an AV program menu via the access of the mobile user interface to the AV signal providing system, the AV program menu linking to the selected AV programs; and
   displaying the AV program menu received through the network by the digital AV signal processing device and storing the AV program menu in the digital Set-top box of the digital AV signal processing device;
   wherein when editing the AV program menu by the digital AV signal processing device, the digital AV signal processing device provides at least one of the following functions: removing the watched AV programs and changing the watching status of AV programs on the AV program menu, and the mobile user interface is synchronized with the AV program menu edited by the digital AV signal processing device and stored in the digital Set-top box of the digital AV signal processing device.

2. The broadcasting method according to claim 1, wherein the AV program menu is retrieved by accessing the file folder.

3. The broadcasting method according to claim 1, further comprising a step of:
   providing a program guide to be fetched by the mobile user interface for a user's reference to create the AV program menu.

4. The broadcasting method according to claim 1, further comprising steps of:
   receiving and storing the AV program menu created by the mobile user interface; and
   transmitting the AV program menu to the digital AV signal processing device via the network to be revealed and selected.

5. The broadcasting method according to claim 4, wherein the AV program menu is transmitted to the digital AV signal processing device in response to a request from the digital AV signal processing device.

6. The broadcasting method according to claim 1, wherein the AV program menu is transmitted from the mobile user interface to the digital AV signal processing device via the network.

7. The broadcasting method according to claim 1 further comprising a step of creating the AV program menu through a user interface provided by the digital AV signal processing device.

8. A broadcasting system, comprising:
a network;
an audio/video (AV) signal providing system which is one of an internet protocol television (IPTV) service provider and a network-attached storage (NAS), in communication with the network, for providing a plurality of AV programs for selection;
a mobile user interface, in communication with the network, for creating a file folder of an AV program menu containing the selected AV programs; and
a digital AV signal processing device, in communication with the network, for revealing and displaying the AV program menu received via the network, storing the AV program menu, and displaying a selected one of the plurality of AV programs in response to a user's selecting operation on the AV program menu revealed thereby;
wherein the mobile user interface is a separate device from the digital AV signal processing device and communicable with the digital AV signal processing device via the network, and the digital AV signal processing device comprises a digital Set-top box and a TV; and
wherein when editing the AV program menu by the digital AV signal processing device, the digital AV signal processing device provides at least one of the following functions: removing the watched AV programs and changing the watching status of AV programs on the AV program menu, and the mobile user interface is synchronized with the AV program menu edited by the digital AV signal processing device and stored in the digital Set-top box of the digital AV signal processing device.

9. The broadcasting system according to claim 8, wherein the program menu is retrieved by accessing the file folder.

10. The broadcasting system according to claim 8, wherein the AV signal providing system further provides a program guide to be fetched by the mobile user interface for a user's reference to create the AV program menu.

11. The broadcasting system according to claim 8, wherein the AV program menu created by the mobile user interface is optionally received and stored by the AV signal providing system, and transmitted to the digital AV signal processing device to be revealed via the network.

12. The broadcasting system according to claim 8, wherein the AV program menu created by the mobile user interface is optionally received and stored by the mobile user interface, and transmitted to the digital AV signal processing device to be revealed via the network.

13. The broadcasting system according to claim 8, wherein the AV program menu is transmitted to the digital AV signal processing device to be revealed in response to a request from the digital AV signal processing device.

14. The broadcasting system according to claim 8, wherein the AV program menu is created based on a user interface provided by the digital AV signal processing device.

15. The broadcasting system according to claim 8, wherein the AV signal providing system is synchronized with the AV program menu edited by the digital AV signal processing device and stored in the digital Set-top box of the digital AV signal processing device via the network.

16. The broadcasting method according to claim 1, further comprising steps of:
synchronizing the AV signal providing system with the AV program menu edited by the digital AV signal processing device and stored in the digital Set-top box of the digital AV signal processing device via the network.

* * * * *